United States Patent
Funakubo (10) Patent No.: US 8,436,502 B2
(45) Date of Patent: May 7, 2013

(54) ELECTRIC MOTOR WITH SEALING MEANS

(75) Inventor: Makoto Funakubo, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 0 days.

(21) Appl. No.: 13/537,554

(22) Filed: Jun. 29, 2012

(65) Prior Publication Data

US 2013/0049503 A1    Feb. 28, 2013

(30) Foreign Application Priority Data

Aug. 30, 2011  (JP) .................. 2011-186920

(51) Int. Cl.
*H02K 5/10*    (2006.01)

(52) U.S. Cl.
USPC .............................................. 310/88; 310/89

(58) Field of Classification Search .................... 310/90, 310/88, 89
See application file for complete search history.

(56) References Cited

U.S. PATENT DOCUMENTS

| 4,995,275 | A | * | 2/1991 | Okamoto et al. ............... 74/7 A |
| 5,101,114 | A | * | 3/1992 | Isozumi et al. ................. 290/48 |
| 6,828,707 | B2 | * | 12/2004 | Hasegawa et al. .............. 310/90 |
| 2002/0157489 | A1 | * | 10/2002 | Murata et al. ...................... 74/6 |

FOREIGN PATENT DOCUMENTS

| JP | 56-30554 U | 3/1981 |
| JP | 10-108436 A | 4/1998 |
| JP | 2000-217297 A | 8/2000 |
| JP | 2010-31837 | 2/2010 |
| JP | 2010-236508 A | 10/2010 |

* cited by examiner

*Primary Examiner* — Nguyen N Hanh
(74) *Attorney, Agent, or Firm* — Drinker Biddle & Reath LLP (57) ABSTRACT

A housing of an electric motor is fitted with an oil seal having the function of sealing an output shaft (rotary shaft) of the motor. The housing is provided with a hole for motor airtightness testing communicating with an internal space of the motor. A local or annular projection configured to close the hole for motor airtightness testing, thereby maintaining the airtightness of the internal space of the electric motor, is disposed on that surface of the oil seal which faces the housing.

12 Claims, 11 Drawing Sheets

ELECTRIC MOTOR WITH SEALING MEANS

RELATED APPLICATION DATA

This application claims priority under 35 U.S.C. §119 and/or §365 to Japanese Application No. 2011-186920 filed Aug. 30, 2011, the entire contents of which are incorporated herein by reference.

BACKGROUND OF THE INVENTION

1. Field of the Invention

The present invention relates to an electric motor provided with an oil seal for closing a hole for motor airtightness testing.

2. Description of the Related Art

Electric motors used in machine tools, industrial equipment, or industrial robots are expected to be highly oil-resistant and drip-proof, and moreover, they must be highly airtight. For airtightness check or testing of a motor being manufactured, a positive or negative pressure is applied to the interior of the motor to check for air leakage to the outside or air inflow, or an oil seal is removed to allow the motor to be internally pressurized.

Japanese Patent Application Laid-Open No. 2010-31837 discloses a technique for reliably preventing water penetration into a bearing that supports a horizontal motor shaft of a pump unit. In this pump unit, a motor housing and pump housing are formed with a shaft-supporting diaphragm between them. The shaft-supporting diaphragm holds an oil seal on the pump-housing side, and a cylinder section is disposed on the motor-housing side.

In general, a bearing is located in a region from which the oil seal is removed. If this bearing is not airtight, air passes through it, so that airtightness testing can be performed without problems. If the bearing used is furnished with a highly airtight seal, in contrast, a hole for air passage must be separately provided such that it can be closed by a plug or the like after airtightness testing is finished. Thus, in the airtightness testing for the case where the highly airtight bearing is used, the component needed to close the hole causes an increase in the number of components and assembly man-hours.

SUMMARY OF THE INVENTION

Accordingly, the object of the present invention is to provide an electric motor comprising sealing means such that an oil seal attached to the electric motor has the functions of sealing an output shaft portion and closing a hole for airtightness testing the moment the oil seal is attached to the electric motor, whereby the number of components and assembly man-hours for closing the hole for airtightness testing can be reduced.

An electric motor according to the present invention comprises a stator unit comprising a winding, a housing attached to an end portion of the stator unit, a rotor unit comprising an output shaft, and an annular oil seal attached to the housing so as to be penetrated by the output shaft. The housing has a hole for motor airtightness testing communicating with an internal space of the electric motor defined by the housing and the stator unit, and the oil seal has a projection formed on that surface thereof which faces the housing and is configured to close the hole for motor airtightness testing, thereby maintaining the airtightness of the internal space of the electric motor.

The shape of the hole for motor airtightness testing in the housing and the cross-sectional shape of the projection of the oil seal configured to close the hole can be made circular or elliptical.

The hole for motor airtightness testing can be disposed at one or more positions in the housing at an arbitrary distance from the central axis of the output shaft, and the projection of the oil seal can be disposed at one or more arbitrary positions nearer to the center of the oil seal than the outermost periphery thereof so as to close the hole for motor airtightness testing.

The hole for motor airtightness testing can be disposed at one or more positions in the housing at an arbitrary distance from the central axis of the output shaft, and the projection can be disposed on the outermost periphery of the oil seal so as to close the hole for motor airtightness testing.

The housing can be formed with a groove having the hole for motor airtightness testing in the bottom or side portion thereof, and the projection can be disposed at a position on the oil seal such that the projection closes the groove in the housing and has a cross-sectional shape corresponding to the shape of the groove.

The groove in the housing can have an annular or arcuate shape around the output shaft penetrating the housing, and the projection on the oil seal can have an annular or arcuate shape around a through-hole through which the output shaft is penetrated.

The projection of annular or arcuate shape may be provided with one or more projections formed on the outermost periphery of the annular oil seal, and the annular or arcuate groove may be formed in the housing fitted with the oil seal at a position corresponding to the projection of the oil seal.

The projection of annular or arcuate shape may be provided with one or more projections formed at an arbitrary position or positions inside the outermost periphery of the annular oil seal, and the annular or arcuate groove may be formed in the housing fitted with the oil seal at a position corresponding to the projection of the oil seal.

A distal end protrusion may be further disposed on the distal end portion of the projection of the oil seal so as to project toward or away from the center of the oil seal, and the groove may be closed by the distal end protrusion and the outer or inner peripheral surface of the projection.

An inward distal end protrusion and an outward distal end protrusion may be further disposed on the distal end portion of the projection of the oil seal so as to project toward and away from the center of the oil seal, respectively, and the groove may be closed by the inward and outward distal end protrusions.

The projection of the oil seal may be provided with, in addition to the distal end protrusion, one or more protrusions of substantially the same shape as the distal end protrusion at a position or positions on the way to the distal end of the projection.

The projection of the oil seal may be provided with, in addition to the pair of inward and outward distal end protrusions, with one or more pairs of protrusions of substantially the same shape as the pair of inward and outward distal end protrusions at a position or positions on the way to the distal end of the projection.

According to the present invention, there can be provided an electric motor comprising sealing means such that an oil seal attached to the electric motor has the functions of sealing an output shaft portion and closing a hole for airtightness testing the moment the oil seal is attached to the electric motor, whereby the number of components and assembly man-hours for closing the hole for airtightness testing can be reduced.

BRIEF DESCRIPTION OF THE DRAWINGS

The above and other objects and features of the present invention will be apparent from the ensuing description of embodiments with reference to the accompanying drawings, in which:

FIGS. 4A and 4B are enlarged sectional views of a portion indicated by dash-dotted line 200 in FIG. 2A, in which FIG. 4A shows a state before the oil seal is attached to the housing, and FIG. 4B shows a state after the oil seal of FIG. 3 is attached to the housing;

FIGS. 7A and 7B are enlarged sectional views of a portion indicated by dash-dotted line 202 in FIG. 5A, in which FIG. 7A shows a state before the oil seal is attached to the housing, and FIG. 7B shows a state after the oil seal of FIG. 6B is attached to the housing;

FIGS. 9A and 9B are enlarged sectional views of a portion indicated by dash-dotted line 204 in FIG. 8A, in which FIG. 9A shows a state before the oil seal is attached to the housing, and FIG. 9B shows a state after the oil seal of FIG. 10A is attached to the housing;

DETAILED DESCRIPTION OF THE PREFERRED EMBODIMENTS

Figure 1:
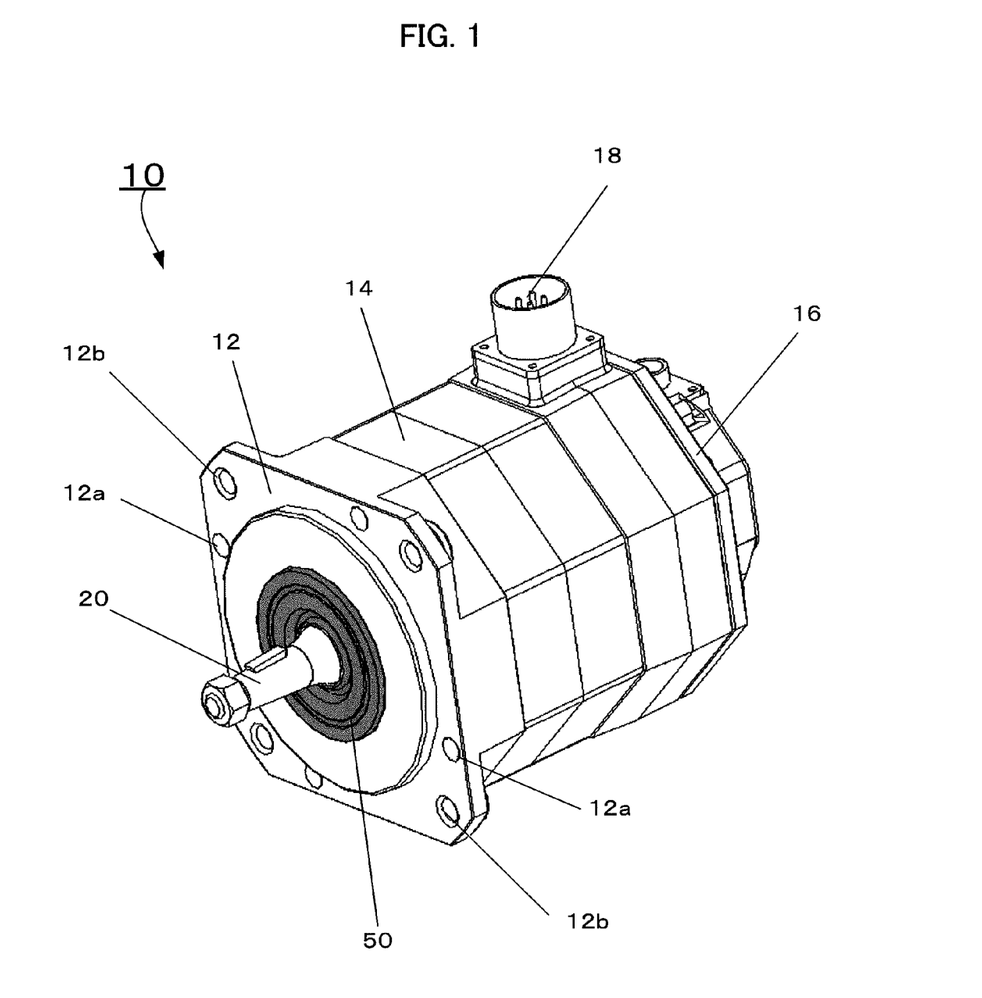
FIG. 1 is a schematic perspective view illustrating a first embodiment of an electric motor according to the present invention in which a first example of sealing means (oil seal) is attached to the housing of the motor.
Figure 2A:
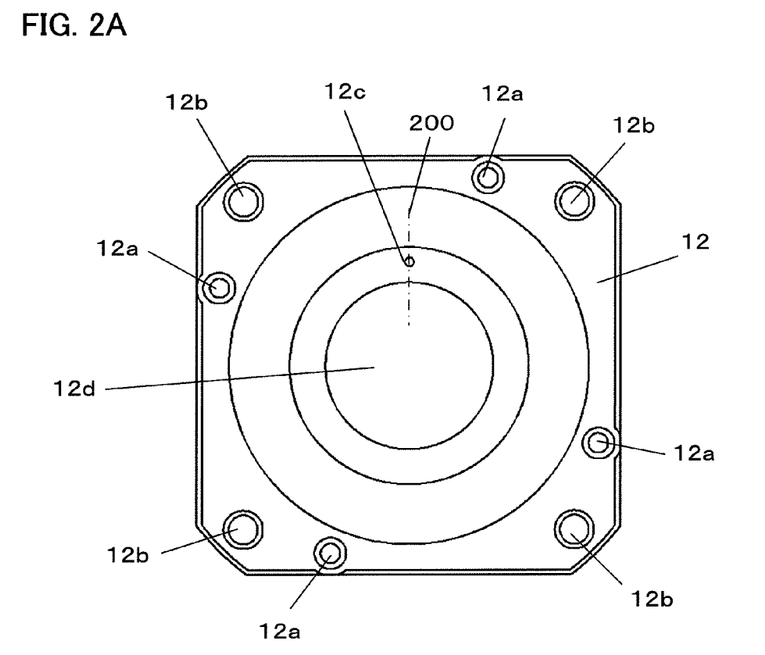
FIG. 2A is a front view of the electric motor of FIG. 1 with its output shaft and oil seal removed.
Figure 2B:
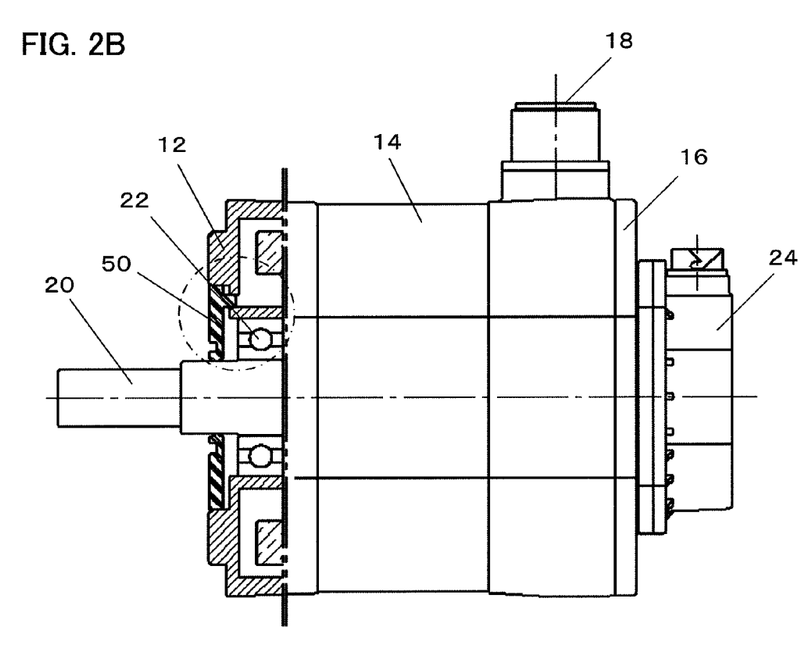
FIG. 2B is a side view (partially in section) of the electric motor of FIG. 1.

Referring now to FIGS. 1, 2A and 2B, there will be described a first embodiment of an electric motor according to the present invention, comprising a first example of oil seal (annular oil seal) attached to its housing.

An electric motor 10 is configured so that windings of a rotor (not shown) and a stator 14 are arranged in a space that is defined by a housing 12 on the output-shaft side, the stator 14, and a housing 16 on the side opposite the output shaft and that a rotary shaft 20 for use as an output shaft is attached to the rotor.

A power supply terminal 18 is a terminal through which electric power for driving the electric motor 10 is supplied. That end surface of the stator 14 which faces the housing 12 on the output-shaft side is formed with a plurality of bolt holes (not shown) for securing the housing 12. An oil seal 50 is attached to that surface of the housing 12 opposite the surface secured to the stator 14. The oil seal 50, like a conventional one, has the function of sealing the rotary shaft 20.

As shown in FIG. 2A, the housing 12 is a substantially rectangular plate-like member formed with a center through-hole 12d through which the rotary shaft 20 is passed. The housing 12 is provided with bolt holes 12a at positions corresponding individually to the bolt holes (for securing the housing 12 to the stator 14) in that end surface of the stator 14 which faces the housing 12. The housing 12 is further formed with a plurality of bolt holes 12b for securing the electric motor 10 to a mechanical unit, such as a machine tool (not shown), and a hole 12c for motor airtightness testing.

As shown in FIG. 2A, the hole 12c for motor airtightness testing is a circular or elliptical hole internally communicating with the electric motor 10 in which the stator 14, rotor, etc., are arranged. Although FIG. 2A shows a state where the hole 12c is formed at a single position in the housing 12, two or more holes for motor airtightness testing may be formed if necessary.

The rotary shaft 20 is an output shaft attached to the rotor and is supported by a ball bearing 22, as shown in FIG. 2B. Further, the oil seal 50 is attached to the housing 12 in such a manner that it closes the hole 12c for motor airtightness testing in the housing 12. The rotational position and speed of the rotary shaft 20 are detected by a position/speed sensor 24 mounted on the shaft 20.

An outline of the oil seal 50 shown in FIGS. 1 and 2B will now be described with reference to FIG. 3.

The oil seal 50 is an annular plate-like member of an elastic material, such as rubber, formed with a center through-hole 54 through which the rotary shaft 20 is passed. The oil seal 50, like a conventional one, serves to seal the electric motor 10 by minimizing the gap between the inner periphery of the through-hole 54 and the outer periphery of the rotary shaft 20. An oil seal according to another example (described later herein) functions in like manner. The thickness of the oil seal 50 (and the oil seal of the alternative example described later) may be selected as required.

Figure 3:
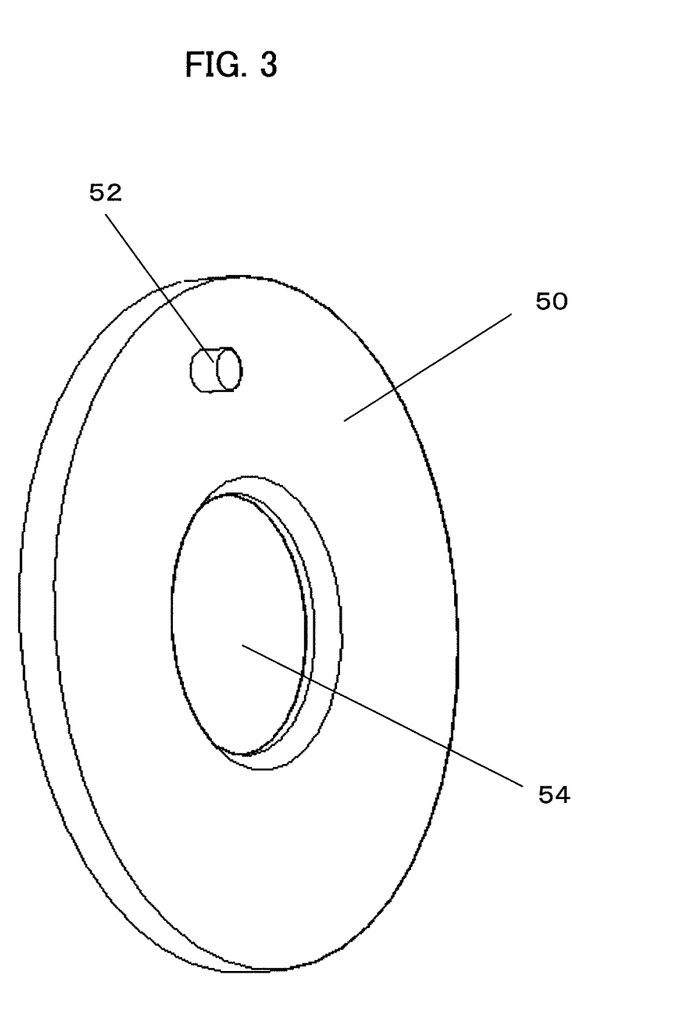
FIG. 3 is an exterior perspective view of the oil seal shown in FIGS. 1 and 2B.

As shown in FIG. 3, a columnar projection 52 is disposed on that surface of the oil seal 50 which contacts the housing 12. The projection 52 has a circular or elliptical cross-section corresponding to the shape of the hole 12c (FIG. 2A) for motor airtightness testing in the housing 12. If elastic rubber or the like is used for the oil seal 50, the projection 52 may be formed so that its outside diameter is slightly larger than the inside diameter of the hole 12c. As mentioned before, the cross-section of the columnar projection 52 of the oil seal 50, as well as the hole 12c for motor airtightness testing, should preferably be circular or elliptical. This is because if the cross-section of the columnar projection 52 is polygonal, airtightness is supposed to be reduced at its corners.

Figure 4A:
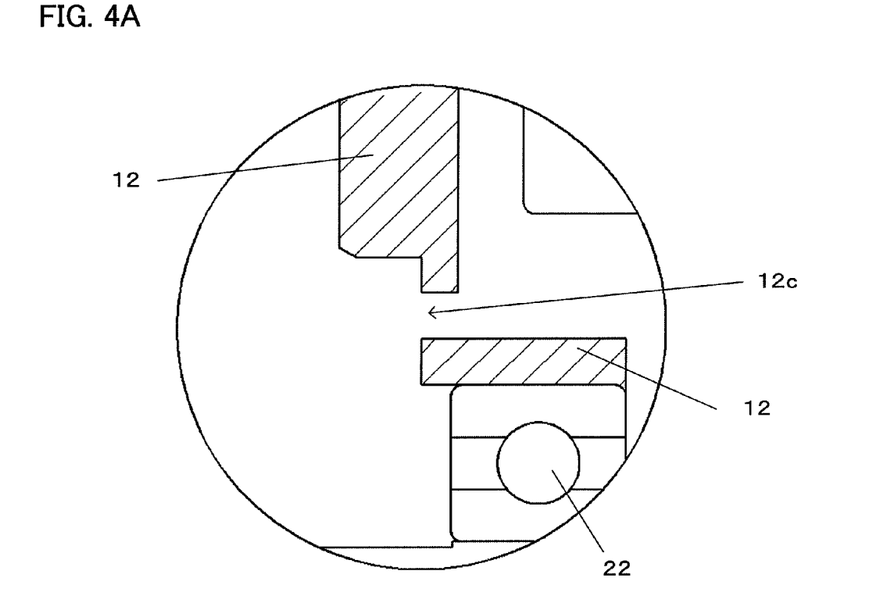
Figure 4B:
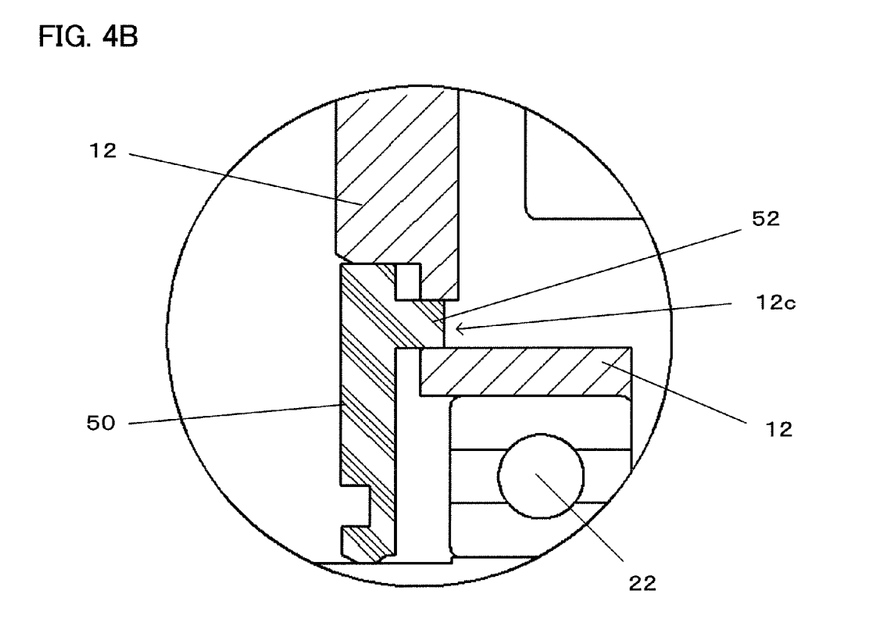

States of the housing 12 before and after it is fitted with the oil seal 50 will be described with reference to FIG. 4A (before fitted) and FIG. 4B (after fitted).

The oil seal 50 is attached to the housing 12 so that its columnar projection 52 closes the hole 12c for motor airtightness testing in the housing 12. Thus, the oil seal 50 attached to the housing 12 is locally provided with the columnar projection 52 that can close the hole 12c in the housing 12. The moment the oil seal 50 is attached to the housing 12 of the electric motor, therefore, the hole 12c in the housing 12 can be closed by the columnar projection 52.

Thus, according to the one embodiment of the present invention, the number of components and assembly man-hours for closing the hole 12c for motor airtightness testing in the housing 12 can be reduced in performing motor airtightness testing using the highly sealed ball bearing 22. The airtightness testing of the electric motor 10 is performed without the attachment of the oil seal 50.

Figure 5A:
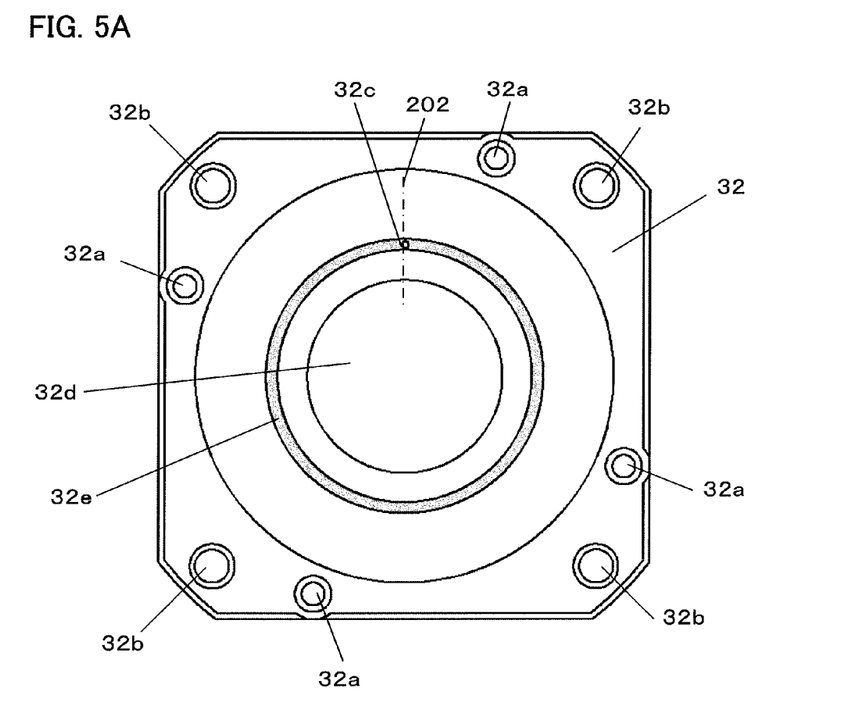
FIGS. 5A and 5B are front and side views, respectively, illustrating a second embodiment of the electric motor according to the present invention in which a second example of sealing means (oil seal) is attached to the housing of the motor.
Figure 5B:
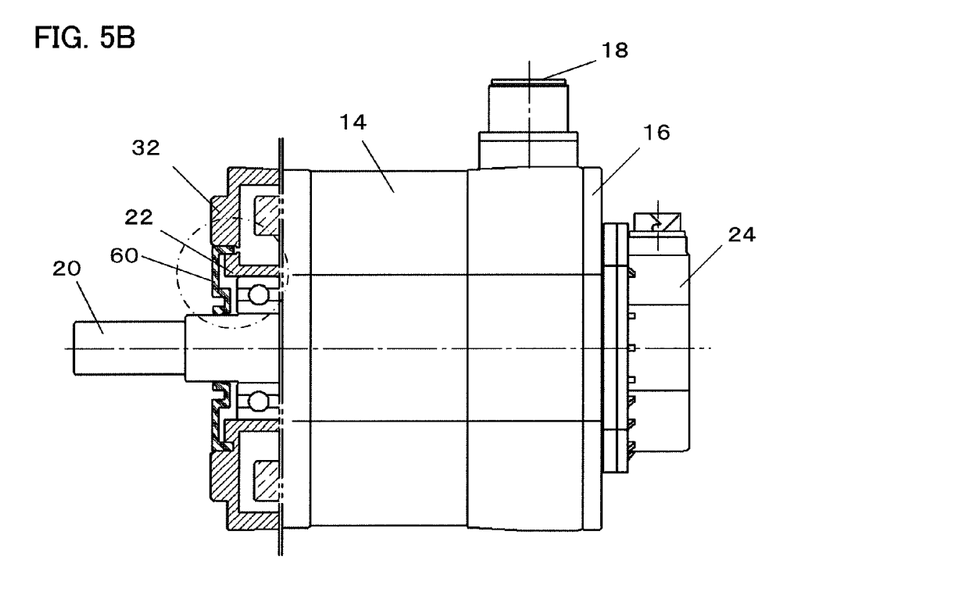

Referring now to FIGS. 5A and 5B, there will be described a second embodiment of the electric motor according to the present invention, in which a second example of oil seal is attached to the housing of the electric motor.

A housing 32 of an electric motor 10 of the second embodiment resembles the housing 12 used in the electric motor 10 of the first embodiment in that it is a substantially rectangular plate-like member formed with a center through-hole 32d through which a rotary shaft 20 is passed. Further, the housing 32 is formed with an annular or arcuate groove 32e that constitutes the whole or part of the circumference of a circle or ellipse around the central axis of the rotary shaft 20 that penetrates the through-hole 32d. Preferably, as shown in FIG. 5A, the groove 32e should be formed throughout the circumference of the circle around the central axis of the rotary shaft 20 that penetrates the through-hole 32d. The groove 32e is formed with a cross-sectional shape (e.g., rectangular or arcuate) such that a projection of an oil seal 60 (described later) can be closely fitted into it.

As shown in FIG. 5A, moreover, the housing 32 is formed with bolt holes 32a at positions corresponding individually to bolt holes in that end surface of a stator 14 which faces the housing 32. The housing 32 is further formed with a plurality of bolt holes 32b for securing the electric motor 10 to a mechanical unit, such as a machine tool (not shown), and a hole 32c for motor airtightness testing. The hole 32c is formed in the annular or arcuate groove 32e of the housing 32, or more specifically, in the side or bottom wall portion of the groove 32e. The hole 32c formed in the groove 32e may be one or two or more in number. The hole 32c for motor airtightness testing internally communicates with the electric motor 10 in which the stator 14, rotor, etc., are arranged. Although the hole 32c is formed at a single position, in the housing 32 of FIG. 5A, two or more holes for motor airtightness testing may be formed if necessary.

Figure 6A:
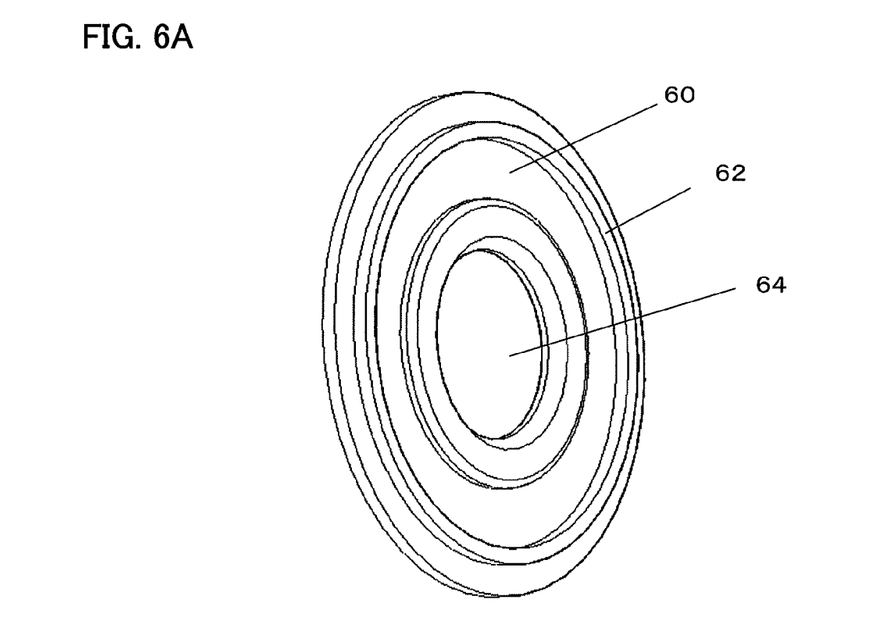
FIGS. 6A and 6B are views showing two examples of the second example of oil seal attached to the housing of the electric motor shown in FIGS. 5A and 5B, respectively.
Figure 6B:
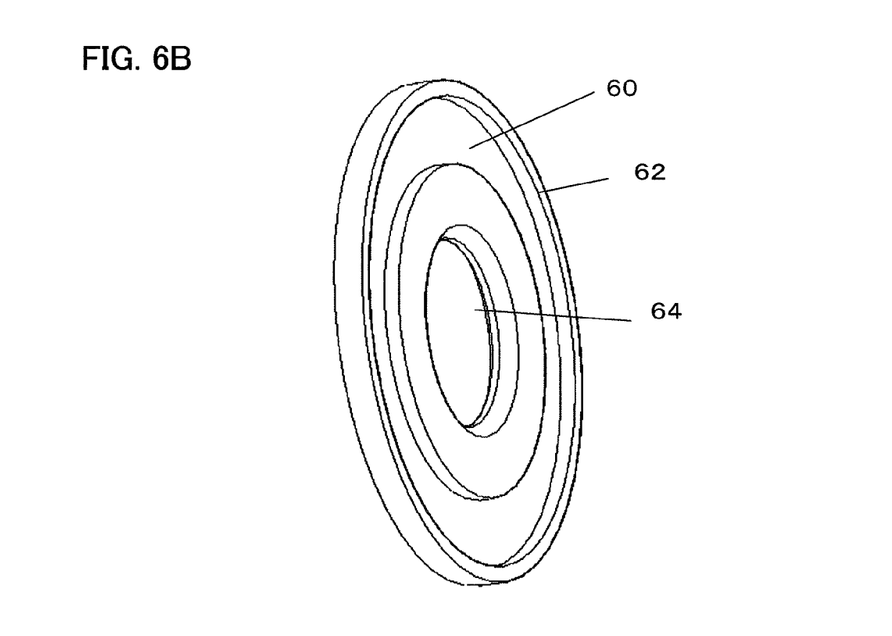

FIGS. 6A and 6B are views showing two examples of the oil seal 60 of the second example attached to the housing 32 of the electric motor shown in FIGS. 5A and 5B, respectively.

The second example of oil seal 60 is an annular plate-like member formed with a center through-hole 64 through which the rotary shaft 20 is passed. An annular projection 62 is disposed on that surface of the oil seal 60 which faces the housing 32 so as to project from the facing surface toward the housing 32. The projection 62 covers the entire circumference of a circle or ellipse around the rotary shaft 20 that penetrates the through-hole 64. The projection 62 need not always be disposed throughout the circumference of this circle or ellipse, and may be an arcuate projection or projections covering one or two or more parts of the circle or ellipse.

As shown in FIG. 6A, the annular or arcuate projection 62 may be located inside (or nearer to the center of the through-hole 64 than) the outermost periphery of the annular plate-like member that constitutes the oil seal 60. Alternatively, the projection 62 may be located along the outermost periphery of the plate-like member, as shown in FIG. 6B. In either case, the projection 62 should only be located at a position on that surface of the oil seal 60 which faces the housing 32 and have a shape such that it can be fitted into the groove 32e (FIG. 5A) in the housing 32.

Figure 7A:
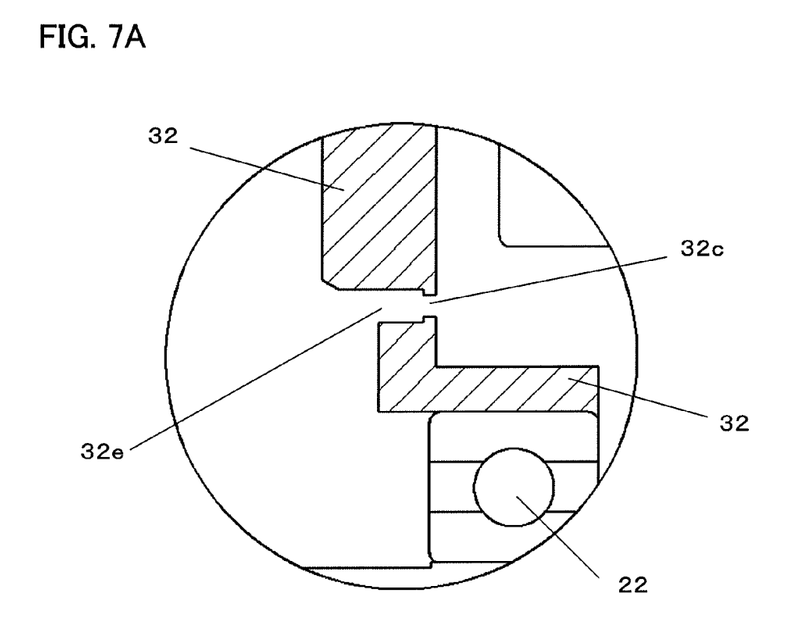
Figure 7B:
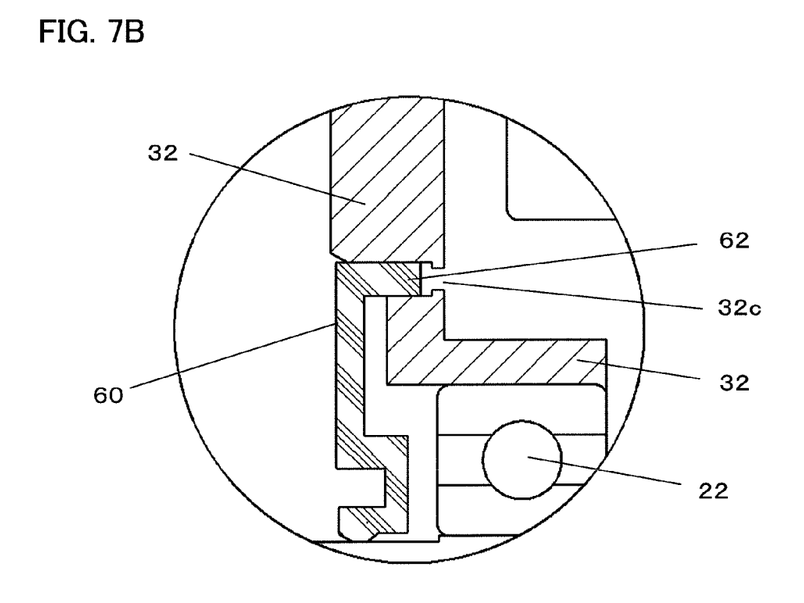

States of the housing 32 before and after it is fitted with the oil seal 60 will be described with reference to FIG. 7A (before fitted) and FIG. 7B (after fitted).

Figure 8A:
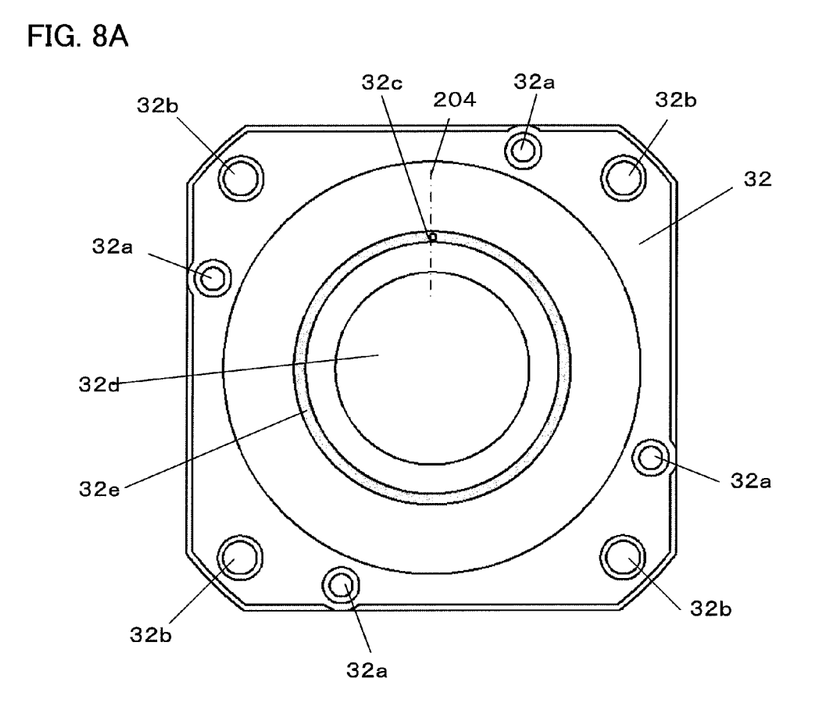
FIGS. 8A and 8B are front and side views, respectively, illustrating a third embodiment of the electric motor according to the present invention in which a third example of sealing means (oil seal) is attached to the housing of the motor.
Figure 8B:
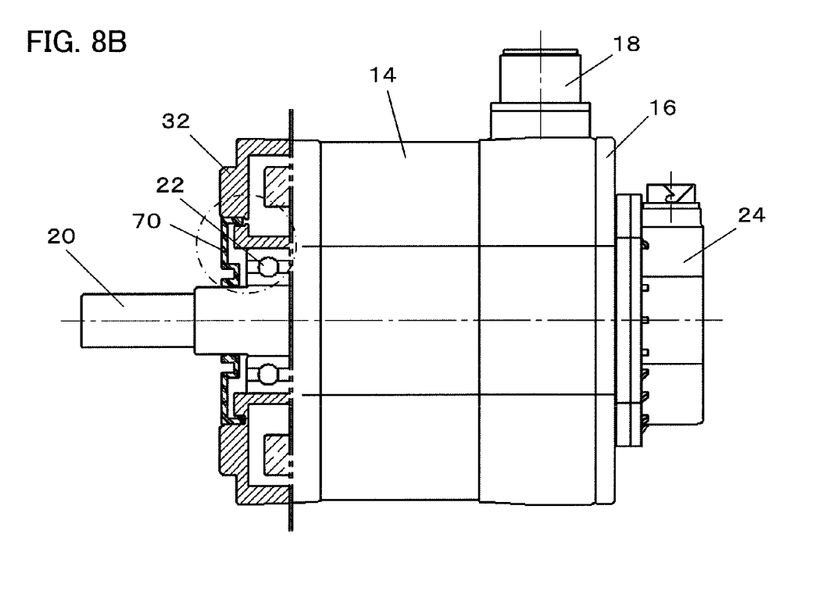

As mentioned before, the housing 32 is formed with the annular or arcuate groove 32e and the hole 32c for motor airtightness testing in the bottom or side wall portion of the groove 32e at an arbitrary position. The airtightness testing of the electric motor 10 is performed without the attachment of the oil seal 60. Referring now to FIGS. 8A and 8B, there will be described a third embodiment of the electric motor according to the present invention, in which a third example of oil seal is attached to the housing of the electric motor.

As shown in FIG. 8A, a housing 32 of the electric motor of the third embodiment has the same structure as the housing 32 of the electric motor of the second embodiment described with reference to FIG. 5A, so that a description thereof is omitted. FIG. 8B shows a state in which a third example of oil seal 70 (described later) is attached to the housing 32 of the electric motor.

Figure 9A:
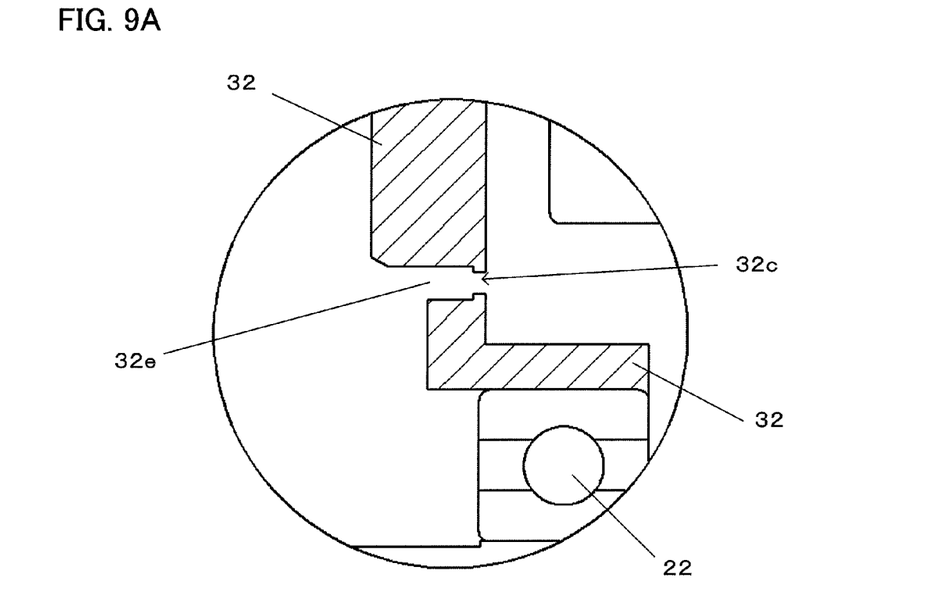

States of the housing 32 shown in FIGS. 8A and 8B before and after it is fitted with the oil seal 70 will be described with reference to FIG. 9A (before fitted) and FIG. 9B (after fitted).

As in the case of the second example of oil seal 60 (FIGS. 6A, 6B, etc.), an annular or arcuate first projection 72 projects toward the housing 32 from that surface of the third example of oil seal 70 which contacts the housing 32. The first projection 72 covers the whole or part of the circumference of a circle or ellipse around a rotary shaft 20 that penetrates a through-hole 64. In the third example of oil seal 70, moreover, a second projection (distal end protrusion) 72R projects from the distal end portion of the first projection 72 toward the rotary shaft 20 which penetrates the oil seal 70, as shown in FIG. 9B. The second projection 72R has a triangular cross-section.

Figure 9B:
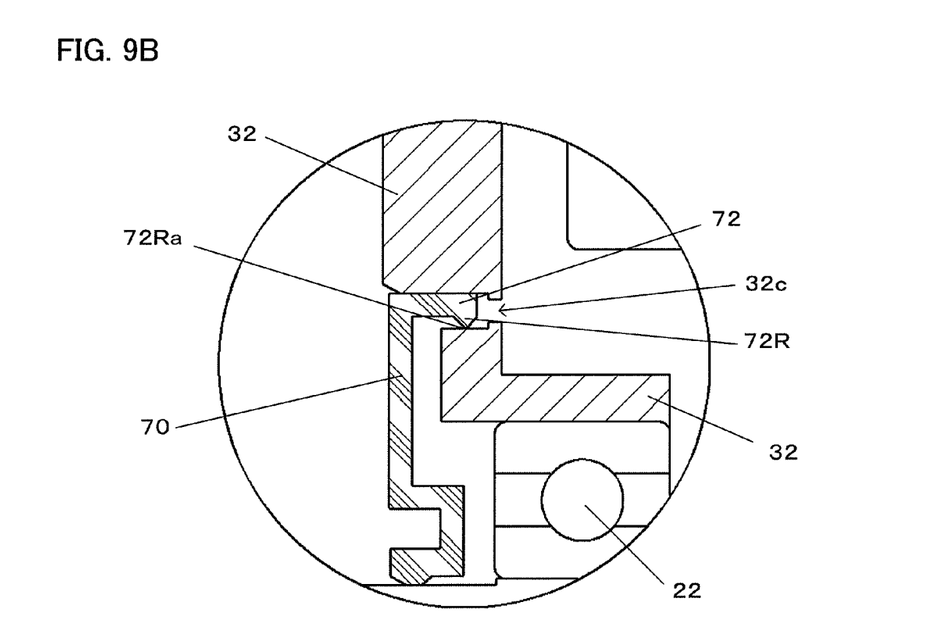

If the oil seal 70 is attached to the housing 32 so that the first projection 72 is fitted into a groove 32e in the housing 32, as shown in FIG. 9B, a vertex 72Ra of the triangular cross-section of the second projection 72R elastically contacts the side wall portion of the groove 32e. Consequently, the groove 32e is sealed by surface contact with the outer peripheral surface of the first projection 72 and line contact with the vertex 72Ra of the second projection 72R, as shown in FIG. 9B.

As mentioned before, the housing 32 is provided with the hole 32c for motor airtightness testing in the bottom or side wall portion of the groove 32e at an arbitrary position. The airtightness testing of the electric motor 10 is performed without the attachment of the oil seal 70.

Three examples of the oil seal 70 with the second projection (distal end protrusion) projecting from the distal end of the first projection 72 will be described with reference to FIGS. 10A, 10B and 11.

Figure 10A:
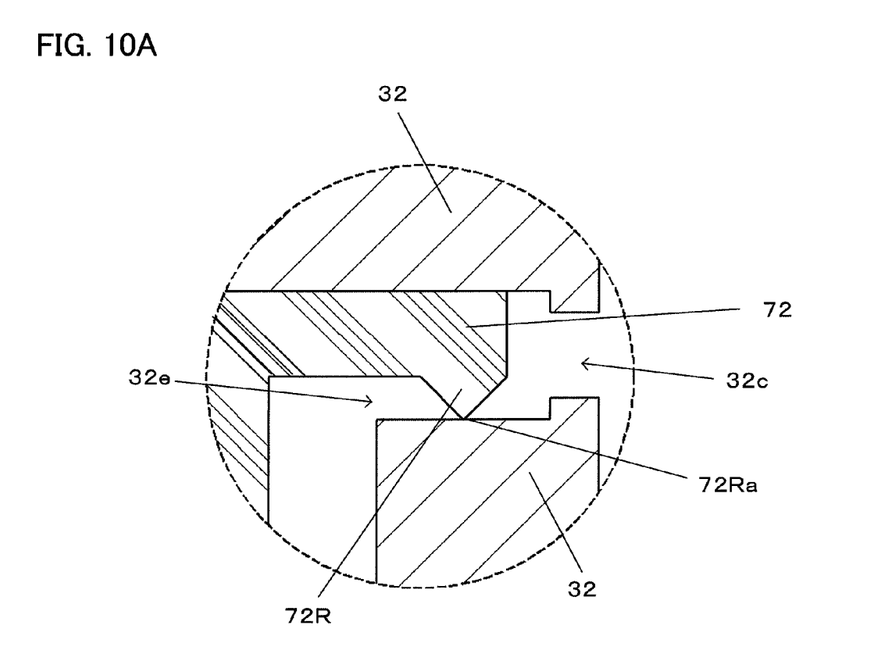
FIGS. 10A and 10B are partially enlarged views showing first and second examples, respectively, of a projection of the oil seal of the type shown in FIG. 9B.

A first example of the oil seal 70 shown in FIG. 10A has the same configuration as that of the oil seal 70 shown in FIG. 9B. As mentioned before, a second projection (inward distal end protrusion) 72R projects inward from the distal end portion of the first projection 72 of the oil seal 70 toward the rotary shaft 20 which penetrates the oil seal 70.

Figure 10B:
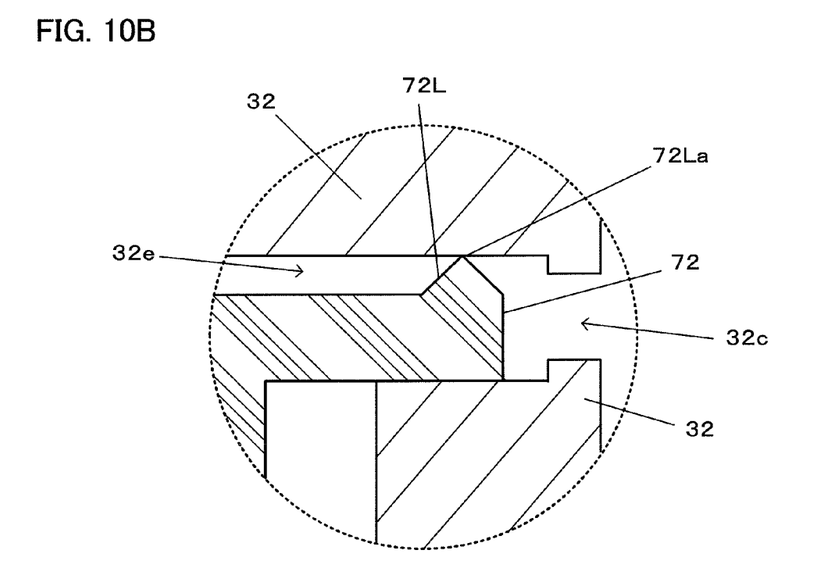

In a second example of the oil seal 70 shown in FIG. 10B, in contrast, a second projection (outward distal end protrusion) 72L with a triangular cross-section is formed on the distal end portion of the first projection 72 of the oil seal 70 so as to project outward away from the rotary shaft 20 that penetrates the oil seal 70 which penetrates the oil seal 70. If the oil seal 70 shown in FIG. 10B is attached to the housing 32 so that the first projection 72 is fitted into the groove 32e in the housing 32, a vertex 72La of the triangular cross-section of the second projection 72L elastically contacts the side wall portion of the groove 32e. Consequently, the groove 32e in the housing 32 is sealed by surface contact with the inner peripheral surface of the first projection 72 and line contact with the vertex 72La of the second projection 72L, as shown in FIG. 10B.

Figure 11:
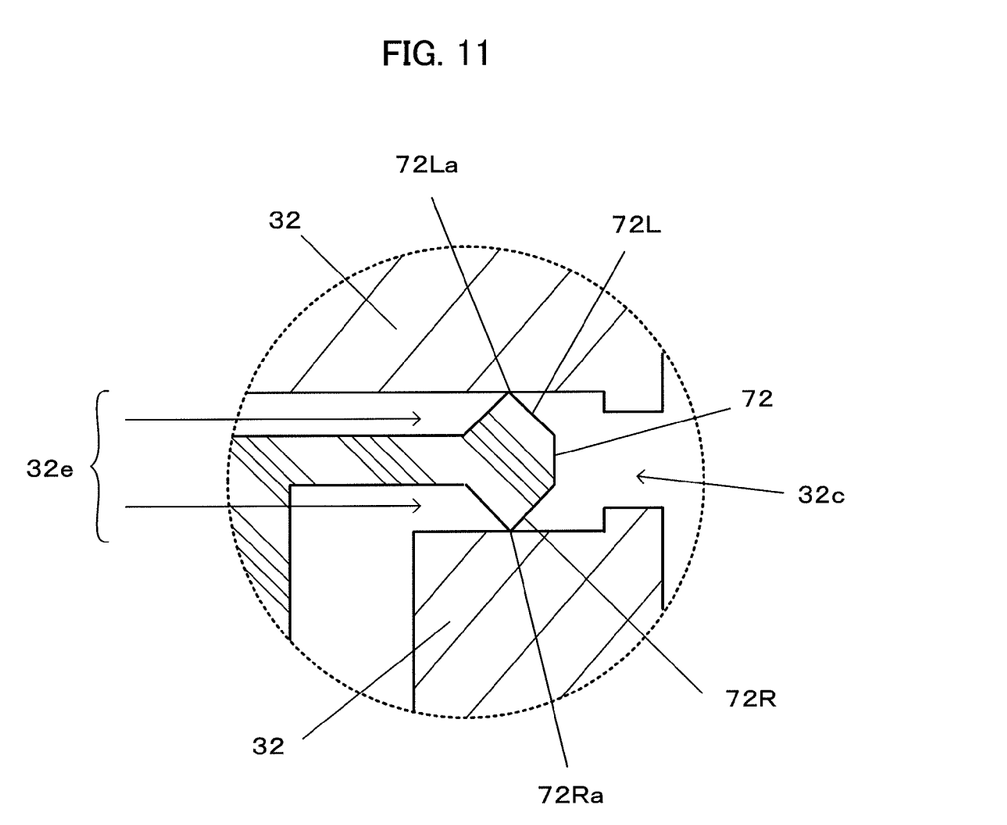
FIG. 11 is a partially enlarged view showing a third example of the projection of the oil seal of the type shown in FIG. 9B.

In a third example of the oil seal 70 shown in FIG. 11, moreover, a second projection (inward distal end protrusion) 72R with a triangular cross-section projects inward from the distal end portion of the first projection 72 of the oil seal 70 toward the rotary shaft 20 which penetrates the oil seal 70, and a third projection (outward distal end protrusion) 72L with a triangular cross-section projects further outward away from the rotary shaft. If the oil seal 70 shown in FIG. 11 is attached to the housing 32 so that the first projection 72 is fitted into the groove 32e in the housing 32, vertices 72Ra and 72La of the respective triangular cross-sections of the second and third projections 72R and 72L elastically contact the side wall portion of the groove 32e. Consequently, the groove 32e is sealed by linear contact with the respective vertices 72Ra and 72La of the second and third projections 72R and 72L, as shown in FIG. 11.

Either of the second projection (inward distal end protrusion) 72R shown in FIG. 10A (and FIG. 9A) and the second projection (outward distal end protrusion) 72L shown in FIG. 10B is disposed on the distal end of the first projection as described above. Alternatively, however, one or more projections of the same shape as the second projection may be additionally disposed on the way to the distal end of the first projection. As described above, the single pair of projections 72R and 72L, second and third, shown in FIG. 11 are disposed on the distal end of first projection. Alternatively, however, one or more pairs of projections 72R and 72L of the same shape may be additionally disposed on the way to the distal end of the first projection. Thus, the second projections are formed at a plurality of longitudinal positions on the first projection 72 of the oil seal 70 so as to project toward or away from the rotary shaft 20 that penetrates the oil seal 70. Based on this arrangement, the groove 32e of the housing can be more completely closed by the oil seal 70.

The invention claimed is:

1. An electric motor comprising:
    a stator unit comprising a winding;
    a housing attached to an end portion of the stator unit;
    a rotor unit comprising an output shaft; and
    an annular oil seal attached to the housing so as to be penetrated by the output shaft,
    wherein the housing has a hole for motor airtightness testing communicating with an internal space of the electric motor defined by the housing and the stator unit, and
    the oil seal has a projection formed on that surface thereof which faces the housing and is configured to close the hole for motor airtightness testing, thereby maintaining the airtightness of the internal space of the electric motor.

2. The electric motor according to claim 1, wherein the shape of the hole for motor airtightness testing in the housing and the cross-sectional shape of the projection of the oil seal configured to close the hole are circular or elliptical.

3. The electric motor according to claim 1, wherein the hole for motor airtightness testing is disposed at one or more positions in the housing at an arbitrary distance from the central axis of the output shaft, and the projection of the oil seal is disposed at one or more arbitrary positions nearer to the center of the oil seal than the outermost periphery thereof so as to close the hole for motor airtightness testing.

4. The electric motor according to claim 1, wherein the hole for motor airtightness testing is disposed at one or more positions in the housing at an arbitrary distance from the central axis of the output shaft, and the projection is disposed on the outermost periphery of the oil seal so as to close the hole for motor airtightness testing.

5. The electric motor according to claim 1, wherein the housing is formed with a groove having the hole for motor airtightness testing in the bottom or side portion thereof, and the projection is disposed at a position on the oil seal such that the projection closes the groove in the housing and has a cross-sectional shape corresponding to the shape of the groove.

6. The electric motor according to claim 5, wherein the groove in the housing has an annular or arcuate shape around the output shaft penetrating the housing, and the projection on the oil seal has an annular or arcuate shape around a through-hole through which the output shaft is penetrated.

7. The electric motor according to claim 6, wherein the projection of annular or arcuate shape comprises one or more projections formed on the outermost periphery of the annular oil seal, and the annular or arcuate groove is formed in the housing fitted with the oil seal at a position corresponding to the projection of the oil seal.

8. The electric motor according to claim 6, wherein the projection of annular or arcuate shape comprises one or more projections formed at an arbitrary position or positions inside the outermost periphery of the annular oil seal, and the annular or arcuate groove is formed in the housing fitted with the oil seal at a position corresponding to the projection of the oil seal.

9. The electric motor according to claim 5, wherein a distal end protrusion is further disposed on the distal end portion of the projection of the oil seal so as to project toward or away from the center of the oil seal, and the groove is closed by the distal end protrusion and the outer or inner peripheral surface of the projection.

10. The electric motor according to claim 5, wherein an inward distal end protrusion and an outward distal end protrusion are further disposed on the distal end portion of the projection of the oil seal so as to project toward and away from the center of the oil seal, respectively, and the groove is closed by the inward and outward distal end protrusions.

11. The electric motor according to claim 9, wherein the projection of the oil seal is provided with, in addition to the distal end protrusion, one or more protrusions of substantially the same shape as the distal end protrusion at a position or positions on the way to the distal end of the projection.

12. The electric motor according to claim 10, wherein the projection of the oil seal is provided with, in addition to the pair of inward and outward distal end protrusions, with one or more pairs of protrusions of substantially the same shape as the pair of inward and outward distal end protrusions at a position or positions on the way to the distal end of the projection.

* * * * *